US011119000B2

(12) United States Patent
Penn et al.

(10) Patent No.: US 11,119,000 B2
(45) Date of Patent: Sep. 14, 2021

(54) FATIGUE TESTING OF A WIND TURBINE BLADE

(71) Applicant: Vestas Wind Systems A/S, Aarhus (DK)

(72) Inventors: Katherine Penn, Shorwell (GB); Guy Stuart, Lockerley (GB); William David Richards, Ventnor (GB); Pierre-Emmanuel Verrien, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 120 days.

(21) Appl. No.: 16/086,898

(22) PCT Filed: Mar. 21, 2017

(86) PCT No.: PCT/DK2017/050081
§ 371 (c)(1),
(2) Date: Sep. 20, 2018

(87) PCT Pub. No.: WO2017/162251
PCT Pub. Date: Sep. 28, 2017

(65) Prior Publication Data
US 2019/0094104 A1    Mar. 28, 2019

(30) Foreign Application Priority Data
Mar. 22, 2016   (GB) ..................... 1604812

(51) Int. Cl.
*G01M 5/00*    (2006.01)
(52) U.S. Cl.
CPC .......... *G01M 5/005* (2013.01); *G01M 5/0016* (2013.01); *G01M 5/0066* (2013.01); *G01M 5/0075* (2013.01)

(58) Field of Classification Search
CPC .. G01M 5/0016; G01M 5/005; G01M 5/0066; G01M 5/0075; G01M 99/007;
(Continued)

(56) References Cited

U.S. PATENT DOCUMENTS 4,481,817 A * 11/1984 Ludowyk ............... G01M 5/005
73/583
8,650,970 B2 * 2/2014 Guy ....................... F03D 17/00
73/862.381

(Continued)

FOREIGN PATENT DOCUMENTS

CN    102156040 A    8/2011
CN    103512732 A    1/2014
(Continued)

OTHER PUBLICATIONS

Intellectual Property Office, Search and Examination Report in GB1604812.6, dated Aug. 22, 2016.
(Continued)

*Primary Examiner* — Natalie Huls
(74) *Attorney, Agent, or Firm* — Wood Herron & Evans LLP (57) ABSTRACT

The application relates to an apparatus (100) for fatigue testing a wind turbine blade specimen (10), and to a method using such an apparatus (100). The apparatus (100) comprises first and second support assemblies (120, 130) and an actuator (140) for cyclically deflecting the specimen (10) in a first transverse direction. The first and second support assemblies (120, 130) comprise first and second holders (121, 131) for holding first and second ends (12, 14) of the specimen (10), respectively, such that the longitudinal direction (16) of the specimen (10) extends between the first and second holders (121, 131). The first and second support assemblies (120, 130) are arranged such that the first and second holders (121, 131) are rotatable about a second
(Continued)

transverse direction perpendicular to the first transverse direction and to the longitudinal direction (16) of the specimen (10). The first support assembly (120) is further arranged such that the first holder (121) is moveable in the longitudinal direction relative to the second holder (131) when the specimen (10) is deflected by the actuator (140) in the first transverse direction.

31 Claims, 5 Drawing Sheets

(58) Field of Classification Search
CPC .... G01N 3/32; G01N 3/20; G01N 2203/0023; G01N 2203/005; G01N 2203/0073
See application file for complete search history.

(56) References Cited

U.S. PATENT DOCUMENTS

| | | | | |
|---|---|---|---|---|
| 8,677,827 | B2* | 3/2014 | Cotrell | G01M 7/06 73/649 |
| 10,053,238 | B1* | 8/2018 | Schilling | G01M 99/007 |
| 2006/0037402 | A1* | 2/2006 | Musial | G01M 7/00 73/664 |
| 2010/0175480 | A1* | 7/2010 | Guy | G01M 7/022 73/660 |
| 2011/0239774 | A1* | 10/2011 | Schuyler | G01N 3/32 73/812 |
| 2013/0061683 | A1* | 3/2013 | Baker | G01M 5/0058 73/834 |
| 2014/0202251 | A1* | 7/2014 | Murtas | G01M 5/0066 73/657 |
| 2016/0047707 | A1* | 2/2016 | Lee | B06B 3/00 73/577 |
| 2016/0109324 | A1* | 4/2016 | Lee | G01M 7/022 73/649 |
| 2017/0241860 | A1* | 8/2017 | Richards | G01M 7/06 |
| 2017/0350785 | A1* | 12/2017 | Greaves | G01M 5/0066 |
| 2020/0011760 | A1* | 1/2020 | Richards | G01M 5/0016 |
| 2020/0209100 | A1* | 7/2020 | Christiansen | G01M 5/0016 |

FOREIGN PATENT DOCUMENTS

| | | |
|---|---|---|
| CN | 104020038 A | 9/2014 |
| CN | 203824722 U | 9/2014 |
| CN | 204594684 U | 8/2015 |
| CN | 105136443 A | 12/2015 |
| CN | 204988909 U | 1/2016 |
| EP | 2741068 A1 | 6/2014 |
| WO | 2004005879 A1 | 1/2004 |
| WO | 2016045684 A1 | 3/2016 |

OTHER PUBLICATIONS

European Patent Office, International Search Report and Written Opinion in PCT/DK2017/050081, dated Sep. 25, 2017.
European Patent Office, Invitation to Pay Additional Fees in PCT/DK2017/050081, dated Jul. 31, 2017.
China National Intellectual Property Administration, First Notification of Office Action in CN Application No. 201780027980.6, dated Jan. 6, 2020.

* cited by examiner

FATIGUE TESTING OF A WIND TURBINE BLADE

The present invention relates to an apparatus for fatigue testing of a wind turbine blade specimen. In particular, the present invention relates to an apparatus for fatigue testing of a wind turbine blade specimen comprising first and second support assemblies for holding the blade specimen, and an actuator for cyclically deflecting the blade in a transverse direction. The present invention also relates to a method of fatigue testing a wind turbine blade specimen.

Wind turbine blades are subjected to cyclical loading during use as a result of inertial loads and aerodynamic loads, such as lift and drag. These loads are experienced in both the edgewise and flapwise directions of the blade. The edgewise direction is perpendicular to the longitudinal axis of the blade and generally parallel to a plane extending through the leading and trailing edges of the blade and corresponds to the direction of rotation of the blade during use. The flapwise direction is perpendicular both to the edgewise direction and to the longitudinal axis of the blade. Such cyclical loading may cause weakening of the blades over the duration of their service life, potentially eventually leading to fatigue failure in the absence of appropriate design. Fatigue testing is used to determine whether a particular blade design can withstand the expected cyclical operating loads without fatigue failure for the duration of the desired service life of the blade.

Fatigue testing is typically carried out by exciting the blade in the flapwise direction and in the edgewise direction to simulate flapwise and edgewise operating loads. For larger blades, these two fatigue tests are typically carried out consecutively. To simulate a typical service life, each test may involve subjecting a blade to one million or more fatigue loading cycles and can take several months to complete. To ensure that the results of the fatigue test are reliable, it is important that the cyclical loads applied during the test are representative of actual loading conditions.

Current blade fatigue testing methods include fixing one end of a wind turbine blade specimen to a stationary base or other fixed structure so that the blade specimen is cantilevered from the stationary base, and applying a cyclical load in a transverse direction of the blade specimen. However, with existing testing arrangements, it may be difficult to make the strain profile applied during the test representative of the strain profile experienced during operation, particularly where the blade specimen forms only part of the wind turbine blade.

It would therefore be desirable to provide an apparatus and method for fatigue testing of a wind turbine blade specimen which is more representative of actual loading conditions.

SUMMARY OF THE INVENTION

According to a first aspect of the invention there is provided an apparatus for fatigue testing a wind turbine blade specimen comprising: a first support assembly comprising a first holder for constraining a first end of the specimen; a second support assembly comprising a second holder for constraining a second end of the specimen such that a longitudinal direction of the specimen extends between the first and second holders; an actuator adapted to cyclically deflect the specimen in a first transverse direction at a loading position between the first and second holders; wherein the first and second support assemblies constrain the specimen from movement in the first transverse direction and are arranged such that the first and second holders are rotatable about an axis extending in a second transverse direction perpendicular to the first transverse direction and to the longitudinal direction of the specimen, and wherein the first support assembly is further arranged such that the first holder is further moveable in the longitudinal direction relative to the second holder when the specimen is deflected by the actuator in the first transverse direction.

With this arrangement, the first and second holders do not rigidly constrain the blade specimen when deflected by the actuator. Instead, the blade is allowed to deform into a bow shape by the rotation of the first and second holders about the second transverse direction. Additionally, the first holder is able to move towards the second holder to compensate for any deflection of the blade specimen. This reduces unrepresentative tensile loading and torsional loading of the blade specimen during the test, allowing the apparatus to exert stresses and strains on the blade specimen which are more representative of actual operating conditions.

As used herein, the term "wind turbine blade specimen" refers to any suitable part of a wind turbine blade, such as a component, assembly of components, or section of a wind turbine blade, or to an entire wind turbine blade which is subject to the fatigue test. Where the blade specimen refers to a part or section of a wind turbine blade, the part or section may still be attached to the remainder of the blade, in which case the term "specimen" refers to the portion of the blade extending between the first and second holders.

The first support assembly may be slidably mounted on a fixed structure to allow the first holder to move in the longitudinal direction relative to the second holder. More preferably, the first support assembly comprises a double pivot mechanism by which the first holder is rotatable about the second transverse direction and moveable in the longitudinal direction relative to the second holder. Preferably, the double pivot mechanism comprises a pivot arm connected to a fixed structure by a lower pivot and connected to the first holder by an upper pivot, the upper and lower pivots both being arranged for rotation about the second transverse direction.

Preferably, the first support assembly is arranged such that displacement of the first holder in the first second transverse direction is substantially prevented when the specimen is deflected by the actuator in the first transverse direction.

The second support assembly may comprise one or more pivots by which the second holder is rotatable about the second transverse direction. Preferably, the second support assembly comprises a single pivot mechanism by which the second holder is rotatable about the second transverse direction.

Preferably, the second support assembly is arranged such that displacement of the second holder in the second transverse direction and in the longitudinal direction is substantially prevented when the specimen is deflected by the actuator in the first transverse direction.

The apparatus may be arranged to hold the wind turbine blade specimen such that its longitudinal direction is substantially horizontal. In other examples, the apparatus may be arranged to hold the wind turbine blade specimen such that its longitudinal direction is non-horizontal, for example substantially vertical. The apparatus may be arranged to hold the wind turbine blade specimen such that its edgewise direction is substantially horizontal. In certain examples, the apparatus is arranged to hold the wind turbine blade specimen such that its longitudinal direction and its edgewise direction are substantially horizontal. By holding the blade specimen such that its edgewise direction is substantially horizontal, the peak strain values at the leading and trailing edges of the blade specimen may be lower and more representative of the loads and R-values, that being the ratio of the minimum to maximum stresses, experienced during operation in comparison to apparatuses in which the edgewise direction of the blade is substantially vertical. This may improve the accuracy of the test results and reduce the reliance on material data extrapolation when calculating expected fatigue life. When the apparatus is arranged to hold the wind turbine blade specimen such that its edgewise direction is substantially horizontal, preferably the actuator is arranged to deflect the blade specimen in a flapwise direction.

The first and second holders may be attached to the blade during use by any suitable means, for example using one or more eyelets or threaded bolts. Preferably, the first and second holders each comprise a holder frame arranged to extend along at least part of the width of the blade specimen by which the first and second support assemblies are attachable to the blade specimen. Preferably, each holder frame forms an enclosure around the blade specimen. The holder frames may be attached directly to the blade specimen, or indirectly via one or more intermediate components. Preferably, the first and second holders each comprise a profiled insert for positioning between the holder frame and the blade specimen, the profiled inserts following the contours of the blade specimen to more evenly distribute loading from the support assemblies to the blade specimen during use of the apparatus. When the holder frames are tightened around the blade specimen relative movement between the holder frames and the blade specimen may be substantially prevented by the profiled inserts.

The first and second support assemblies may be mounted such that the longitudinal spacing between the first and second holders is fixed. Preferably, the longitudinal spacing between the first and second holders is selectively adjustable. That is, the position of the first and second holders relative to each other may be changed between tests to adjust the longitudinal spacing between the first and second holders. This allows the apparatus to be adapted for testing specimens differing in length. The first and second holders may be mounted into a fixed structure of the apparatus, for example into the floor of a testing hall or into a fixed support element. The first and second holders may be mounted into the fixed structure using a plurality of connectors on the fixed structure. The fixed structure may comprise a plurality of connectors defining a plurality of mounting positions for one or both of the first and second support assemblies by which the longitudinal spacing between the first and second holders is selectively adjustable.

In certain embodiments, the fixed structure comprises a first base portion on which the first support assembly is mounted and a second base portion on which the second support assembly is mounted. The first and second base portions may be moveable relative to each other to selectively adjust the longitudinal spacing between the first and second holders.

The apparatus may further comprise at least one additional weight for attaching to the blade specimen to selectively modify a strain profile applied to the blade specimen when it is cyclically deflected in the first transverse direction by the actuator. The at least one additional weight may be attachable to the blade specimen by any suitable means, for example by gluing. Preferably, the apparatus further comprises a load frame which is attachable to the blade specimen, the load frame comprising at least one additional weight to selectively modify a strain profile applied to the blade specimen when it is cyclically deflected in the first transverse direction by the actuator. The apparatus may comprise two or more such load frames which are attachable to the blade specimen at different positions. The additional weight or weights are positioned so as to modify the mode shape of oscillation across the specimen and in particular at a target region or regions, and hence to modify the strain profile.

The position of the actuator may be selectively adjustable to vary the loading position. This allows the loading of the blade specimen to be tuned according to a target region of interest for the fatigue test. Alternatively, the position of the actuator relative to the first and second holders may be substantially fixed. The actuator may be articulated to a fixed structure of the apparatus. For example, the actuator may be articulated to a fixed structure of the apparatus, for example a floor of a test hall in which the apparatus is housed, such that it is rotatable about the second transverse direction.

According to a second aspect of the present invention, there is provided a method of fatigue testing a wind turbine blade specimen, the method comprising the steps of: providing first and second support assemblies for the specimen; holding the specimen with the first and second support assemblies by constraining a first end of the specimen with a first holder of the first support assembly and constraining a second end of the specimen with a second holder of the second support assembly such that the longitudinal direction of the specimen extends between the first and second holders, the first and second support assemblies being arranged such that the first and second holders are rotatable about a second transverse direction perpendicular to the longitudinal direction of the specimen, the first support assembly being further arranged such that the first holder is further moveable in the longitudinal direction relative to the second holder; connecting the specimen to an actuator at a loading position between the first and second holders; and cyclically deflecting the specimen in a first transverse direction perpendicular to the longitudinal direction of the specimen and to the second transverse direction by generating a cyclical deflection force with the actuator, the first and second support assemblies constraining movement of the holders against movement in the first transverse direction, the deflection of the specimen causing the first and second holders to rotate about the second transverse axis and causing the first holder to move in the longitudinal direction towards to the second holder.

As described above in relation to the apparatus of the first aspect, with the method according to the present invention, the first and second holders do not rigidly constrain the blade specimen when deflected by the actuator. Instead, the blade is allowed to deform into a bow shape by the rotation of the first and second holders about the second transverse direction and by movement of the first holder is able to move towards the second holder. This reduces unrepresentative tensile loading and torsional loading of the blade specimen during the test, allowing the apparatus to exert stresses and strains on the blade specimen which are more representative of actual operating conditions.

Preferably, the first support assembly comprises a double pivot mechanism by which the first holder is rotatable about the second transverse direction and moveable in the longitudinal direction relative to the second holder. The double pivot mechanism may comprise a pivot arm connected to a fixed structure of the apparatus by a lower pivot and connected to the first holder by an upper pivot, the upper and lower pivots both being arranged for rotation about the second transverse direction.

Preferably, the step of providing the first and second support assemblies comprises the steps of selectively adjusting the longitudinal spacing between the first and second holders and mounting the first and second support assemblies into a fixed structure. That is, the position of the first and second holders relative to each other may be changed between tests to adjust the longitudinal spacing between the first and second holders. This allows the apparatus to be adapted according to the length and region of the specimen which is subject to the fatigue test. The first and second holders may be mounted on the fixed structure using a plurality of connectors on the fixed structure. The fixed structure may be, for example, a floor of a test hall in which the test apparatus is housed or a fixed support element connected to a ground surface such as a wall or floor. The fixed structure may comprise a plurality of connectors defining a plurality of mounting positions for one or both of the first and second support assemblies. In such examples, the step of selectively adjusting the longitudinal spacing may be carried out by changing the mounting position of one or both of the first and second support assemblies by using a different one of the plurality of connectors.

The method may further comprise the step of selectively adjusting the loading position of the actuator. This may be carried out, for example, by changing a mounting position of the actuator on a fixed structure to which it is mounted.

The method may further comprise the step of attaching at least one additional weight to the blade specimen to selectively modify a strain profile applied to the blade specimen when it is cyclically deflected in the first transverse direction by the actuator. The at least one additional weight may be attached to the blade specimen using any suitable method, such as gluing. The step of attaching the at least one additional weight may comprise attaching one or more load frames to the blade specimen, the one or more load frames comprising at least one additional weight.

The step of attaching at least one additional weight may be carried out by selecting a weight amount and weight position to modify the mode shape of cyclic deflection to generate a desired strain profile at a target location along the length of the specimen. The step of selecting a weight amount and weight position may be carried out based on one or more test parameters taken from a group consisting of: specimen stiffness, specimen mass, unit strains, material properties, number of cycles for the fatigue test, deflection of the specimen, calculated bending moment profile, calculated strain profile, calculated shear force profile, calculated displacement profile, calculated natural frequency with the selected weight amount and weight position, calculated natural frequency without any additional weight, calculated number of cycles to failure with the selected weight amount and weight position.

According to a third aspect of the present invention, there is provided a method of fatigue testing a wind turbine blade specimen, the method comprising the steps of: providing first and second support assemblies for the specimen; holding the specimen with the first and second support assemblies by constraining a first end of the specimen with a first holder of the first support assembly and constraining a second end of the specimen with a second holder of the second support assembly such that the longitudinal direction of the specimen extends between the first and second holders; connecting the specimen to an actuator at a loading position between the first and second holders; attaching at least one additional weight to the specimen to selectively modify a strain profile applied to the blade specimen; and cyclically deflecting the specimen in a first transverse direction perpendicular to the longitudinal direction of the specimen by generating a cyclical deflection force with the actuator, the first and second support assemblies constraining the specimen against movement in the first transverse direction.

With this method, the strain profile of applied to the blade specimen can be modified to target, or isolate, a particular region of the blade specimen. For example, to applied a representative strain profile to a target region of the blade specimen which may be susceptible to high damage or to determine the effectiveness of repairs made to the blade specimen. The strain profile applied to the blade specimen may be modified such that the strain applied to other regions of the specimen is lower than the strain applied to the target region. This reduces the risk that the blade specimen will be weakened outside of the target region during the test. Thus, the accuracy of the test may be improved. It also means that the mean loads and peak moments experienced by the test apparatus may also be lower, leading to lower wear of test apparatus components. This can extend the life of the test apparatus and reduce the maintenance requirements.

Preferably, the first and second support assemblies are arranged such that the first and second holders are each rotatable about a second transverse direction perpendicular to the longitudinal direction of the specimen and to the first transverse direction, the first support assembly being further arranged such that the first holder is moveable in the longitudinal direction relative to the second holder. With this arrangement, the first and second holders are able to rotate about the second transverse axis and the first holder is able to move in the longitudinal direction towards to the second holder when the blade specimen is deflected. As with the method according to the second aspect of the invention, this reduces unrepresentative tensile loading and torsional loading of the blade specimen during the test, allowing the apparatus to exert stresses and strains on the blade specimen which are more representative of actual operating conditions.

The step of attaching at least one additional weight may be carried out by selecting a weight amount and weight position to generate a desired strain profile at one or more target locations along the length of the specimen. The step of selecting a weight amount and weight position may be carried out based on one or more test parameters taken from a group consisting of: specimen stiffness, specimen mass, unit strains, material properties, number of cycles for the fatigue test, deflection of the specimen, calculated bending moment profile, calculated strain profile, calculated shear force profile, calculated displacement profile, calculated natural frequency with the selected weight amount and weight position, calculated natural frequency without any additional weight, calculated number of cycles to failure with the selected weight amount and weight position.

In any of the above methods, the step of cyclically deflecting the specimen is preferably carried out by generating the cyclical deflection force at a resonant frequency of the blade specimen.

In any of the above methods, the blade section is preferably a wind turbine blade section or a wind turbine blade subcomponent.

Features described in relation to one or more aspects may equally be applied to other aspects of the invention. In particular, features described in relation to the apparatus of the first aspect may be equally applied to the methods of the second and third aspects and vice versa.

BRIEF DESCRIPTION OF THE DRAWINGS

The invention will now be further described by way of example only and with reference to the accompanying figures in which.

DETAILED DESCRIPTION

Figure 1:
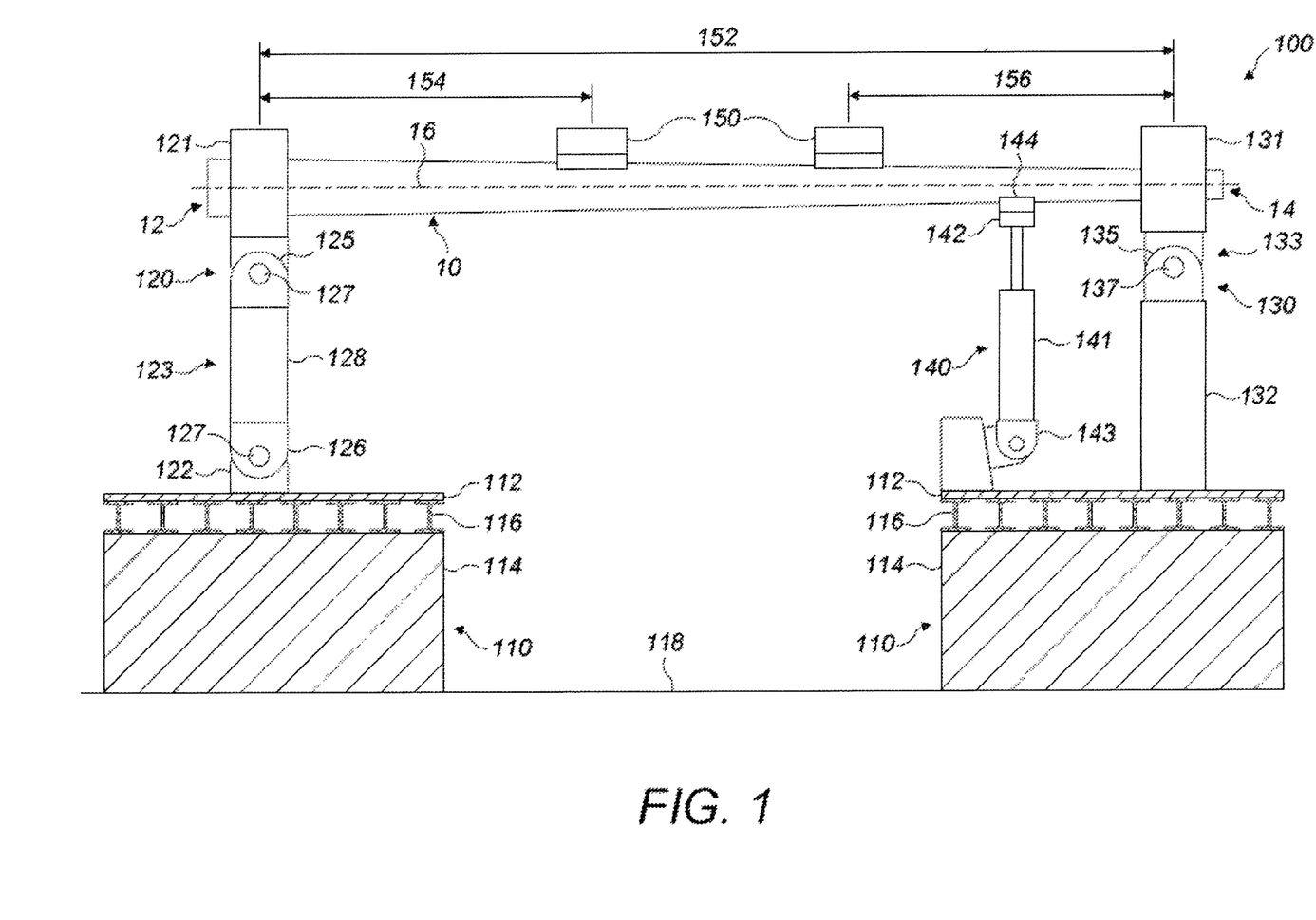
FIG. 1 is a schematic side view of a first example of test apparatus according to the invention, showing the apparatus attached to a wind turbine blade section.

FIG. 1 shows a first test apparatus 100 for fatigue testing a wind turbine blade specimen 10 to which the apparatus 100 is attached. The wind turbine blade specimen 10 has a first end 12, an opposed second end 14 and a longitudinal direction 16 extending between the first end 12 and the second end 14. In this example, the wind turbine blade specimen 10 is illustrated as a section of a wind turbine blade. However, the wind turbine blade specimen 10 could be a complete wind turbine blade, or a wind turbine blade component, such as a structural beam or spar, or a section thereof.

The test apparatus 100 comprises a fixed structure 110, a first support assembly 120, a second support assembly 130, and an actuator 140. The first support assembly 120, second support assembly 130, and the actuator 140 are mounted on, and supported by, the fixed structure 110. The blade specimen 10 is held at or near its first end 12 by the first support assembly 120 and at or near its second end 14 by the second support assembly 130 such that the longitudinal direction 16 of the blade specimen 10 extends between the first and second support assemblies 120, 130. The blade specimen 10 is constrained at opposite ends by the respective support assemblies which allow limited movement as now described.

The fixed structure 110, or base, comprises a pair of rigid mounting surfaces 112, such as steel plates, on which the first support assembly 120, the second support assembly 130 and the actuator 140 are mounted. In this example, the base 110 further comprises a pair of concrete blocks 114 to which the mounting surfaces 112 are fixed via a series of I-beams 116. In this example, the base 110 is positioned on a substantially horizontal ground surface 118, for example the floor of a test hall, such that the mounting surface 112 and the longitudinal direction 16 of the blade specimen 10 are substantially horizontal. With this arrangement, the apparatus 100 can be modified to test specimens of different lengths by altering the distance between the concrete blocks 114 and thus the spacing between the first and second supports 120, 130. In other words, the distance between the first and second supports 120, 130 is adjustable. In other examples, the concrete blocks 114 and I-beams 116 may be omitted and the mounting surfaces 112 attached directly to a ground surface. With this arrangement, the blade section 10 may be supported such that its longitudinal direction 16 is orientated differently, for example substantially vertically, by fixing the mounting surfaces to an alternative surface, such as a vertical wall.

Figure 2:
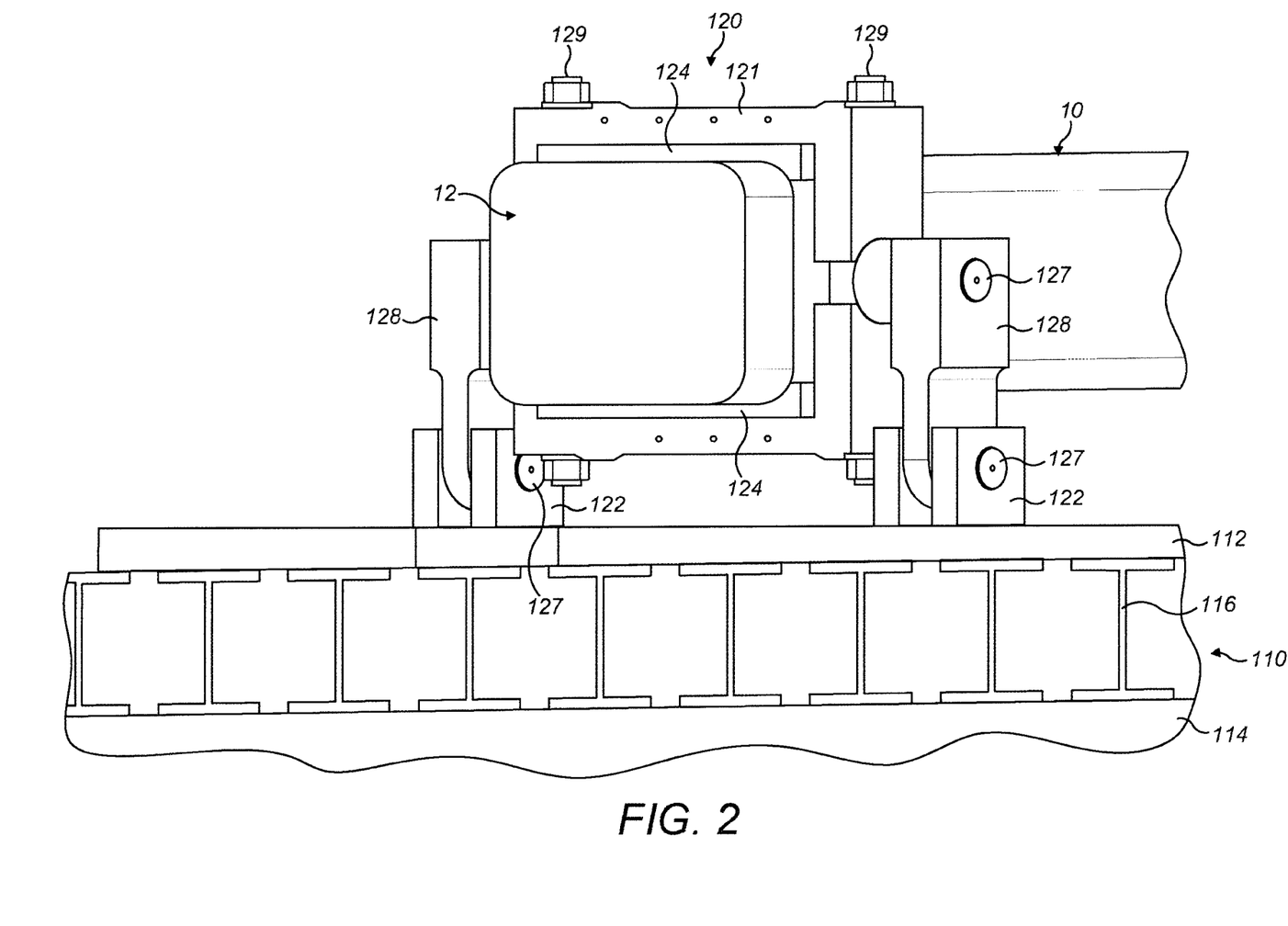
FIG. 2 is a schematic perspective view of part of the test apparatus of FIG. 1, showing the first support assembly.

The first support assembly 120 comprises a first holder in the form of a first holder frame 121, extending around the blade specimen 10, and a first support mount 122 for fixing the first support assembly 120 to the mounting surface 112. The first holder frame 121 is articulated to the first support mount 122 by a double pivot mechanism 123. Referring to FIG. 2, the first holder frame 121 comprises profiled inserts 124, for example wooden inserts, which are positioned between the blade specimen 10 and the holder frame 121 and which follow the contours of the blade specimen 10 to more evenly distribute loading from the first support assembly 120 to the blade specimen 10 during use of the apparatus. The holder frame 121 is tightened around the blade specimen 10 using tightening bolts 129 so that relative movement between the first holder frame 121 and the blade specimen is substantially prevented by the profiled inserts 124. The double pivot mechanism 123 comprises an upper pivot 125 and a lower pivot 126, each of which has a pivot pin 127 extending along a pivot axis which is perpendicular to the longitudinal direction 16 of the blade specimen 10 and parallel to the mounting surface 112 of the base 110. The upper pivot 125 and lower pivot 126 are joined by a rigid link 128. The first holder frame 121 is pivotably fixed to the rigid link 128 by the upper pivot 125 and the rigid link 128 is pivotably fixed to the first support mount 122 by the lower pivot 126.

Figure 3:
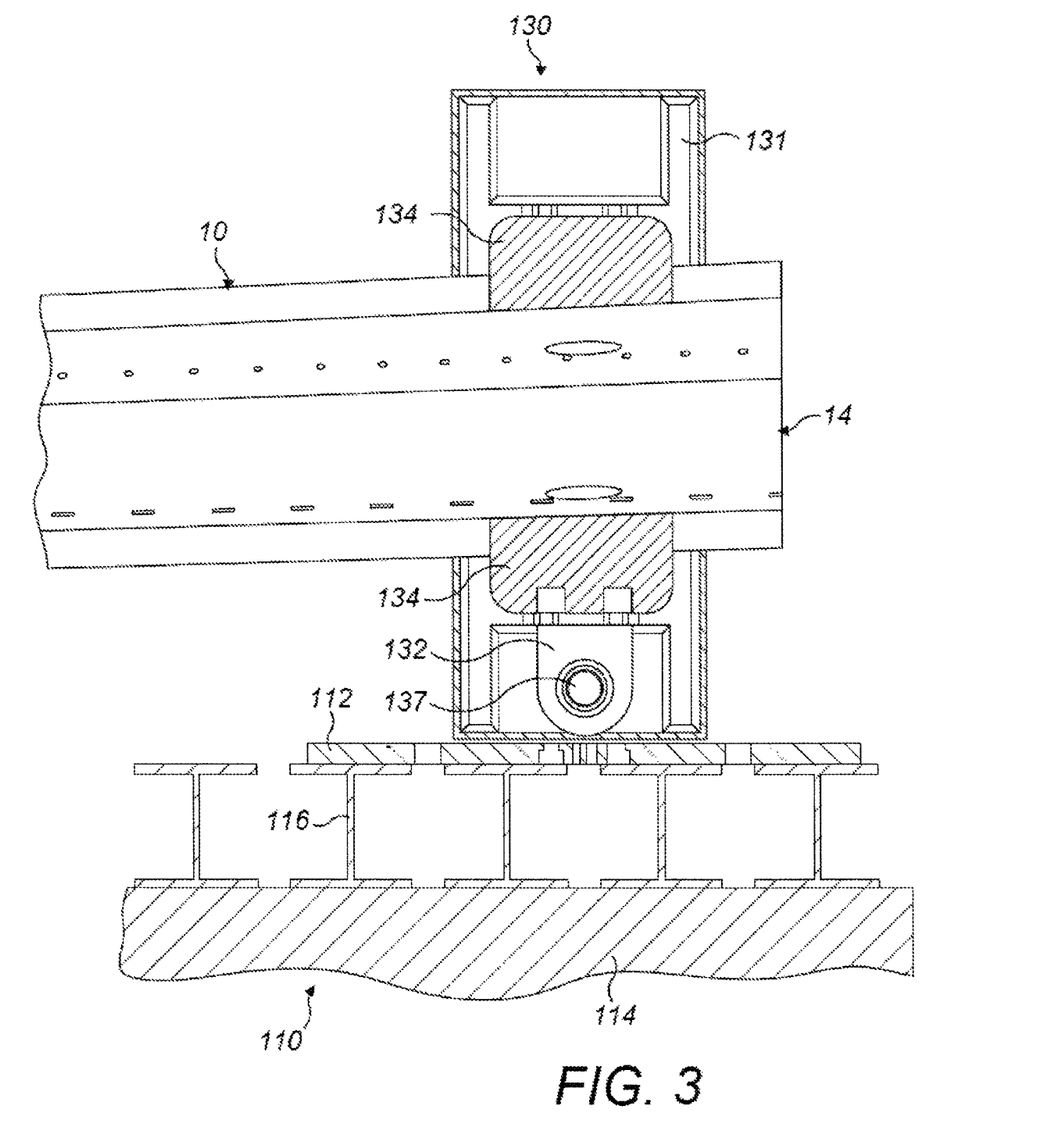
FIG. 3 is a schematic cross-sectional view of the second support assembly of the test apparatus of FIG. 1.

The second support assembly 130 comprises a second support frame 131, extending around the blade specimen 10, and a second support mount 132 for fixedly connecting the second support assembly 130 to the mounting surface 112. The second holder frame 131 is articulated to the second support mount 132 by a single pivot mechanism 133. Referring to FIG. 3, the second holder frame 131 comprises profiled inserts 134, for example wooden inserts, which are positioned between the blade specimen 10 and the holder frame 131 and which follow the contours of the blade specimen 10 to more evenly distribute loading from the second support assembly 130 to the blade specimen 10 during use of the apparatus. The holder frame 131 is tightened around the blade specimen 10 so that relative movement between the second holder frame 131 and the blade specimen is substantially prevented by the profiled inserts 134. The single pivot mechanism 133 comprises a single pivot 135 having a pivot pin 137 extending along a pivot axis which is perpendicular to the longitudinal direction 16 of the blade specimen 10 and parallel to the mounting surface 113 of the base 110. The pivot axis of the single pivot 135 is parallel to the pivot axes of the double pivot mechanism 123 of the first support assembly 120. The second holder frame 131 is pivotably fixed to the second support mount 132 by the single pivot 135. The second support mount 132 is longer than the first support mount 122 to bring the height of the single pivot 135 to a similar level to the height of the upper pivot 125 of the first support assembly 120.

The actuator 140 comprises a linear actuator having a cylinder 141 and a piston 142 that is slidable within the cylinder 141. The actuator 140 is articulated to the base 110 of the apparatus 100 by a pivot 143 to which the cylinder 141 is attached. The actuator is attached to the blade by one or more studs (not shown) which extend through the blade centre or extend on opposite sides of the blade to clamp the blade. The actuator 140 is arranged to deflect the blade specimen 10 in a first transverse direction, that is, in a direction which is perpendicular to the longitudinal axis 16 of the blade specimen 10. The first transverse direction is also perpendicular to a second transverse direction about which the first and second holders 121, 131 are rotatable. In FIG. 1, the blade specimen 10 is shown as being supported by the apparatus 100 such that its longitudinal axis and its edgewise direction are substantially horizontal. In this position, the actuator 140 is arranged to deflect the blade specimen 10 in a flapwise direction. By holding the blade specimen such that its edgewise direction is substantially horizontal, the peak strain values at the leading and trailing edges of the blade specimen are lower and more representative of the loads and R-values, that being the ratio of the minimum to maximum stresses, experienced during operation in comparison to apparatuses in which the edgewise direction of the blade is substantially vertical. This may improve the accuracy of the test results and reduce the reliance on material data extrapolation when calculating expected fatigue life. In other examples, the apparatus may be arranged to hold the blade specimen such that its edgewise direction is non-horizontal, for example vertical. In such examples, the actuator may be arranged to cyclically deflect the blade specimen in the edgewise direction.

In further examples, the apparatus may be arranged to hold the blade specimen such that its longitudinal direction is non-horizontal, for example vertical.

In FIG. 1, the piston 142 is shown in a mid-stroke position, i.e. mid way between the fully retracted and fully extended positions. In this position, the piston 142 is in contact with the underside of the blade specimen 10 at a loading position 144 but the blade specimen 10 is not deflected by the actuator 140.

The first support assembly 120, second support assembly 130, and the actuator 140 may be fixed to the mounting surfaces 112 by any suitable connection means. For example, the mounting surfaces 112 may each comprise a plurality of threaded bolts (not shown) which are fixed to corresponding bolt holes on each of the first support assembly 120, second support assembly 130, and the actuator 140 using threaded nuts. The position of each of the first support assembly 120, second support assembly 130 and actuator 140 along the length of the blade specimen 10 may be varied by altering the position of each on the mounting surfaces 112, for example by using a threaded bolt in a different position on the mounting surface 112, or by moving the mounting surfaces 112 themselves.

In use, the piston 142 is reciprocated relative to the cylinder 141 by an actuator drive means (not shown), such as a hydraulic or pneumatic pump, or an electrical power source, to generate a cyclical deflection force which is transmitted to the blade specimen 10 at the loading position 144 by the piston 142. During each cycle, the piston 142 is alternately retracted and extended by the actuator drive means.

During each extension stroke, the piston 142 deflects the blade specimen 10 upwardly at the loading position 144 until the piston 142 reaches its extended position. As the first and second support frames 121, 131 are pivotably connected to the base 110 via upper pivot 125 and single pivot 135, respectively, when the blade specimen 10 is deflected upwardly, the first and second support frames 121, 131 are free to pivot outwardly relative to the base 110 to allow the blade specimen 10 to deform into a bow shape without being rigidly constrained by the first and second supports 120, 130. Additionally, due to the provision of the lower pivot 126, the rigid link 128 is free to pivot towards the second support assembly 130 to allow some translation of the first support frame 121, and consequently the first end 12 of the blade specimen 10, in the longitudinal direction 16 towards the second support assembly 130 to compensate for the upward deflection of the blade specimen 10. This reduces unrepresentative tensile loading and torsional loading of the blade specimen 10 by the first and second supports 120, 130. With this arrangement, the blade specimen 10 can move more freely when deflected by the actuator 140 and the apparatus 100 can exert stresses and strains on the blade specimen 10 during the test which are more representative of actual operating conditions.

Since the piston 142 is attached to the blade specimen 10, during each retraction stroke, the piston 142 moves towards the cylinder 141 to deflect the blade specimen 10 towards the actuator 140. The actuator 140 thus drives the blade specimen 10 in both directions to deflect the blade specimen 10 away from the actuator 140 during each extension stroke and towards the actuator 140 during each retraction stroke. In alternative examples, the piston 142 may be unattached to the blade specimen 10 so that the blade specimen 10 is deflected away from the actuator 140 by the piston 142 during each expansion stroke and allowed to deflect towards the actuator 140 during each retraction stroke under the action of its own momentum.

At start-up, the cyclical deflection force generated by the actuator 140 is steadily increased from zero until it reaches its operating frequency at a resonance frequency of the blade specimen 10, at which it remains for the duration of the test. By exciting the blade specimen 10 at a resonance frequency the energy requirements of the apparatus 100 are lower than for forced vibration testing apparatuses. It also means that the mean and peak loading on the first and second supports 120, 130 during the test are lower.

As also shown in FIG. 1, additional weights 150 can be attached along the length of the blade specimen 10, for example using glue or clamps, to alter the natural frequency and mode shape of the blade specimen 10. Altering the natural frequency allows the specimen 10 to be 'tuned' so that it can be tested at a manageable frequency. For example, the natural frequency of the blade specimen 10 can be reduced by the weights 150 if the natural frequency of the blade specimen 10 is above the operating frequency of the actuator 140. Altering the mode shape of the blade specimen 10 allows the testing apparatus 100 to target a certain region or regions of the blade specimen 10, as discussed below in relation to FIG. 4. In the example shown in FIG. 1, the distance 152 between the centre of the first and second supports 120, 130 is approximately 13 metres and the additional weights 150 comprise a first weight of approximately 300 kg fixed to the blade section 10 at a distance 154 of approximately 5.5 metres from the centre of the first support assembly 120 and a second weight of approximately 200 kg fixed to the blade section 10 at a distance 156 of approximately 5.5 metres from the centre of the second support assembly 130.

Figure 4:
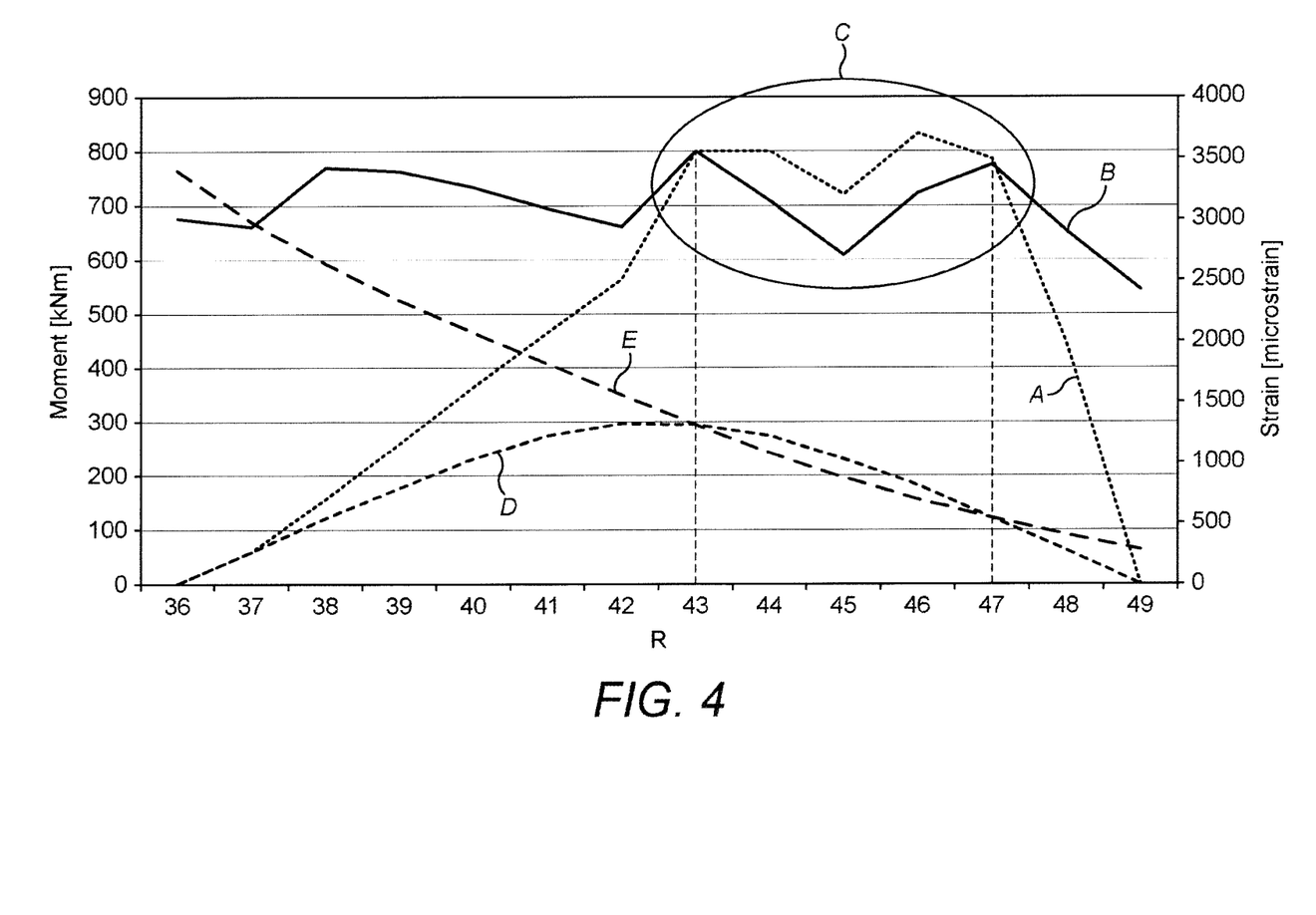
FIG. 4 is a graph showing an example relationship between strain and the distance, and bending moment and distance along a blade specimen tested using the apparatus of FIG. 1.

FIG. 4 shows an example relationship between strain and the distance along the blade specimen 10 and bending moment and distance. In FIG. 4, chart line A represents strain against distance for a blade specimen 10 using the apparatus 100 and chart line B represents strain against distance for the same portion of blade as measured on a full scale fatigue test of a cantilevered blade according to a conventional test. Line D shows the variation in bending moment over the specimen and line E bending moment in a test of a full scale cantilevered blade, representing a target for the present specimen test. Region C shows a target region along the length of the blade specimen which is the focus for the fatigue test. The target region may be selected according to any number of requirements. For example, the target region may be selected to test particular regions of interest or concern in a new blade design, such as where there are internal structural features which might constitute local regions of increased stress concentration, or to test one or more repairs carried out along the length of the blade specimen, such then being possible without the cost or time implications associated with full scale testing of an entire wind turbine blade. Note that the irregular shape of the strain profile is due to the presence of internal non-uniform structural features, such as material drop-offs. As shown in FIG. 4, by careful selection and positioning of the additional weights along the length of the blade section, the strain profile can be modified so that strains experienced by the blade section in the target region are closely matched to the strains experienced in the same region during a full scale wind turbine blade test, that is to a target strain representative of actual conditions. Typically, the weights will be arranged to ensure test strains exceed target by a small percentage. As also shown, the strains experienced by the blade section outside of the target region are significantly lower than those in the full scale test. This has the result that there is less risk that the blade specimen will be weakened outside of the target region during the test. Thus, the accuracy of the test may be improved. It also means that the mean loads and peak moments experienced by the test apparatus are also lower, leading to lower wear of test apparatus components. This can extend the life of the test apparatus and reduce the maintenance requirements.

Figure 5:
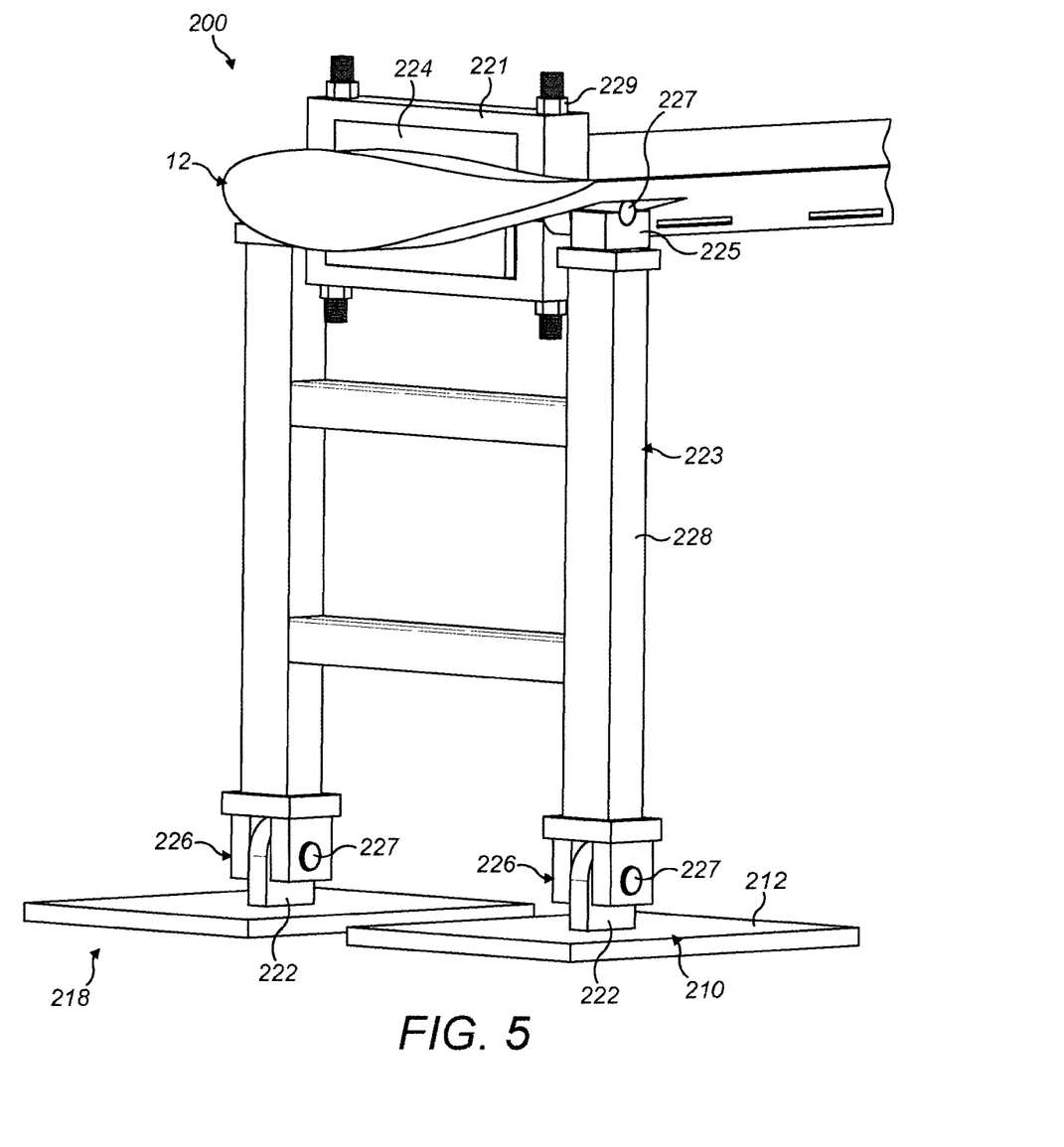
FIG. 5 is a schematic perspective view of part of a second example test apparatus according to the invention, showing the first support assembly.

FIG. 5 shows a portion of a second example apparatus 200 according to the present invention, showing the first support end of the apparatus 200. The apparatus 200 is similar to the first example apparatus 100 shown in FIGS. 1 to 3. However, although the fixed structure 210 of apparatus 200 also includes a mounting surface 212 for the first support assembly 220, the fixed structure 210 does not include a concrete block or a series of I-beams underneath the first support assembly 220. Instead, the mounting surface 212 of the fixed structure 210 beneath the first support assembly 220 is secured directly to the floor 218. To account for the reduced height caused by the absence of the concrete block, the rigid link 228 of the first support assembly 220 of apparatus 200 is longer than the equivalent component of apparatus 100 to bring the height of the first holder frame 221 up, for example to a similar height as the first holder frame of the first apparatus 100. Although not shown in FIG. 5, the mounting surface beneath the second support may also be secured directly to the floor. In such examples, the second support mount may be longer than the equivalent component of apparatus 100 to raise the second holder frame, for example to a similar height as the first support frame of the first apparatus 100. In other examples, the second support, and the mounting surface beneath the second support, may be substantially the same as described above in relation to apparatus 100.

The present invention has particular benefit for fatigue testing of wind turbine blade sections or wind turbine blade subcomponents, as opposed to entire wind turbine blades.

It will be appreciated that various modifications to the embodiments described above are possible and will occur to those skilled in the art without departing from the scope of the invention which is defined by the following claims.

The invention claimed is:
1. An apparatus for fatigue testing a wind turbine blade specimen comprising:
   a first support assembly comprising a first holder for constraining a first end of the specimen, wherein the first support assembly includes a double pivot mechanism having a fixed length between an upper pivot and a lower pivot;
   a second support assembly comprising a second holder for constraining a second end of the specimen such that a longitudinal direction of the specimen extends between the first and second holders; and
   an actuator adapted to cyclically deflect the specimen in a first transverse direction at a loading position between the first and second holders;
   wherein the first and second support assemblies constrain the specimen from movement in the first transverse direction and are arranged such that the first and second holders are rotatable about an axis extending in a second transverse direction perpendicular to the first transverse direction and to the longitudinal direction of the specimen, and wherein the first support assembly is further arranged such that the first holder is further moveable in the longitudinal direction relative to the second holder when the specimen is deflected by the actuator in the first transverse direction.

2. The apparatus according to claim 1, wherein the first holder is rotatable about the second transverse direction and moveable in the longitudinal direction relative to the second holder.

3. The apparatus according to claim 1, wherein the double pivot mechanism comprises a pivot arm having the lower pivot at one of its ends by which it is connectable to a fixed structure and having the upper pivot at the other one of its ends by which it is connected to the first holder, the upper and lower pivots both being arranged for rotation about the second transverse direction.

4. The apparatus according to claim 1, wherein the first support assembly is arranged such that displacement of the first holder in the second transverse direction is substantially prevented when the specimen is deflected by the actuator in the first transverse direction.

5. The apparatus according to claim 1, wherein the second support assembly comprises a single pivot mechanism by which the second holder is rotatable about the second transverse direction.

6. The apparatus according to claim 1, wherein the second support assembly is arranged such that displacement of the second holder in the second transverse direction and in the longitudinal direction is substantially prevented when the specimen is deflected by the actuator in the first transverse direction.

7. The apparatus according to claim 1, wherein the longitudinal spacing between the first and second holders is selectively adjustable.

8. The apparatus according to claim 1, wherein the first and second support assemblies are mounted into a fixed structure of the apparatus.

9. The apparatus according to claim 8, wherein the fixed structure comprises a plurality of connectors defining a plurality of mounting positions for one or both of the first and second support assemblies by which the longitudinal spacing between the first and second holders is selectively adjustable.

10. The apparatus according to claim 8, wherein the fixed structure comprises a first base portion on which the first support assembly is mounted and a second base portion on which the second support assembly is mounted, the first and second base portions being moveable relative to each other to selectively adjust the longitudinal spacing.

11. The apparatus according to claim 1, wherein the apparatus is arranged to hold the wind turbine blade specimen with the first and second support assemblies such that its longitudinal direction is substantially horizontal.

12. The apparatus according to claim 1, further comprising a load frame which is attachable to the blade specimen, the load frame comprising at least one additional weight to selectively modify a strain profile applied to the blade specimen when it is cyclically deflected in the first transverse direction by the actuator.

13. The apparatus according to claim 1, wherein the position of the actuator is selectively adjustable to vary the loading position.

14. The apparatus according to claim 1, wherein the only movement of the first holder relative to the first support assembly is rotational and the only movement of the second holder relative to the second support assembly is rotational.

15. A method of fatigue testing a wind turbine blade specimen, the method comprising the steps of:
providing an apparatus having first and second support assemblies for the specimen, wherein the first support assembly includes a double pivot mechanism having a fixed length between an upper pivot and a lower pivot;
holding the specimen with the first and second support assemblies by constraining a first end of the specimen with a first holder of the first support assembly and constraining a second end of the specimen with a second holder of the second support assembly such that the longitudinal direction of the specimen extends between the first and second holders, the first and second support assemblies being arranged such that the first and second holders are each rotatable about an axis extending in a second transverse direction perpendicular to the longitudinal direction of the specimen, the first support assembly being further arranged such that the first holder is further moveable in the longitudinal direction relative to the second holder;
connecting the specimen to an actuator at a loading position between the first and second holders; and
cyclically deflecting the specimen in a first transverse direction perpendicular to the longitudinal direction of the specimen and to the second transverse direction by generating a cyclical deflection force with the actuator, the first and second support assemblies constraining movement of the holders against movement in the first transverse direction, the deflection of the specimen causing the first and second holders to rotate about the second transverse axis and causing the first holder to move in the longitudinal direction towards to the second holder.

16. The method of fatigue testing a wind turbine blade specimen according to claim 15, wherein the first holder is rotatable about the second transverse direction and moveable in the longitudinal direction relative to the second holder.

17. The method according to claim 15, wherein the double pivot mechanism comprises a pivot arm connected to a fixed structure of the apparatus by the lower pivot and connected to the first holder by the upper pivot, the upper and lower pivots both being arranged for rotation about the second transverse direction.

18. The method according to claim 15, wherein the step of providing the first and second support assemblies comprises the steps of selectively adjusting the longitudinal spacing between the first and second holders and mounting the first and second support assemblies into a fixed structure of the apparatus.

19. The method according to claim 18, wherein the fixed structure comprises a plurality of connectors defining a plurality of mounting positions for one or both of the first and second support assemblies and wherein the step of selectively adjusting the longitudinal spacing is carried out by changing the mounting position of one or both of the first and second support assemblies by using a different one of the plurality of connectors.

20. The method according to claim 15, further comprising the step of selectively adjusting the loading position of the actuator.

21. The method according to claim 15, further comprising the step of attaching at least one additional weight to the specimen to selectively modify a strain profile applied to the blade specimen when it is cyclically deflected in the first transverse direction by the actuator.

22. The method according to claim 21, wherein the step of attaching at least one additional weight is carried out by selecting a weight amount and weight position to generate a desired strain profile at a target location along the length of the specimen.

23. The method according to claim 22, wherein the step of selecting a weight amount and weight position is carried out based on one or more test parameters taken from a group consisting of: specimen stiffness, specimen mass, unit strains, material properties, number of cycles for the fatigue test, deflection of the specimen, calculated bending moment profile, calculated strain profile, calculated shear force profile, calculated displacement profile, calculated natural frequency with the selected weight amount and weight position, calculated natural frequency without any additional weight, calculated number of cycles to failure with the selected weight amount and weight position.

24. The method according to claim 15, wherein the step of cyclically deflecting the specimen is carried out by generating the cyclical deflection force at a resonant frequency of the blade specimen.

25. The method according to claim 15, further comprising the step of identifying a target location requiring specific investigation and attaching one or more additional weights to the specimen to generate a desired strain profile at the target location when the blade specimen is cyclically deflected in the first transverse direction by the actuator.

26. The method according to claim 15, wherein the blade specimen is a section of a wind turbine blade or a subcomponent of a wind turbine blade.

27. The method according to claim 15, wherein the first and second holders are each in a static position when the specimen is undeflected by the actuator, the first and second support assemblies preventing movement of the first and second holders in the first transverse direction beyond their respective static positions.

28. The method according to claim 15, wherein the only movement of the first holder relative to the first support assembly is rotational and the only movement of the second holder relative to the second support assembly is rotational.

29. An apparatus for fatigue testing a wind turbine blade specimen comprising:
a first support assembly comprising a first holder for constraining a first end of the specimen;
a second support assembly comprising a second holder for constraining a second end of the specimen such that a longitudinal direction of the specimen extends between the first and second holders; and
an actuator adapted to cyclically deflect the specimen in a first transverse direction at a loading position between the first and second holders;

wherein the first and second holders are each in a static position when the specimen is undeflected by the actuator; and wherein the first and second support assemblies prevent movement of the first and second holders in the first transverse direction beyond their respective static positions and are arranged such that the first and second holders are rotatable about an axis extending in a second transverse direction perpendicular to the first transverse direction and to the longitudinal direction of the specimen, and wherein the first support assembly is further arranged such that the first holder is further moveable in the longitudinal direction relative to the second holder when the specimen is deflected by the actuator in the first transverse direction.

30. The apparatus according to claim 29, wherein the first support assembly comprises a double pivot mechanism by which the first holder is rotatable about the second transverse direction and moveable in the longitudinal direction relative to the second holder.

31. The apparatus according to claim 29, wherein the second support assembly comprises a single pivot mechanism by which the second holder is rotatable about the second transverse direction.

* * * * *